March 27, 1928. 1,664,046
I. ROSENBERG
APPARATUS FOR REGULATING THE ADMIXTURE OF A SOLUTION TO RUNNING WATER
Filed March 14, 1927
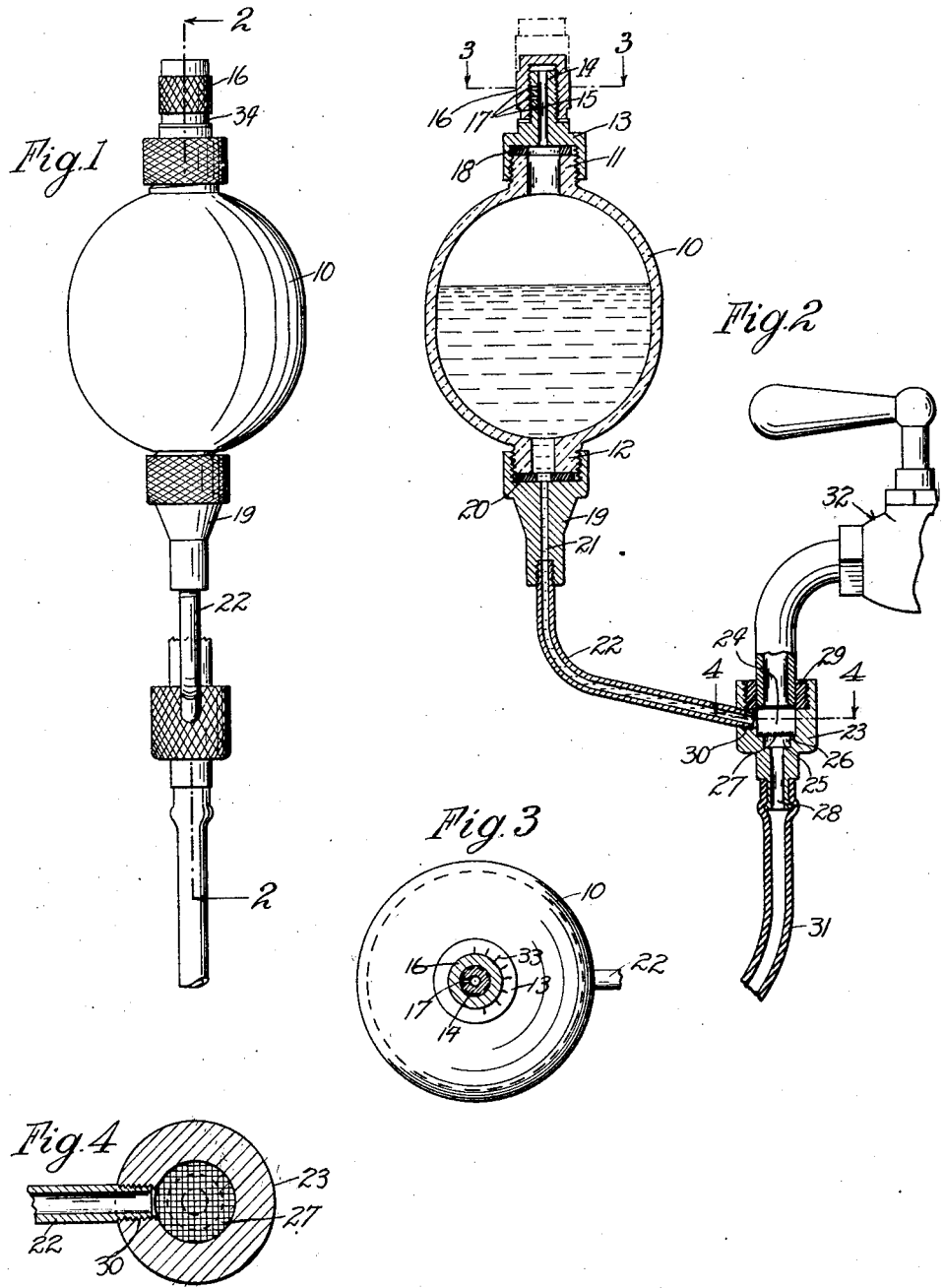
Inventor
Ida Rosenberg
by Henry Hech
Attorney.

Patented Mar. 27, 1928.

1,664,046

UNITED STATES PATENT OFFICE.

IDA ROSENBERG, OF CHICAGO, ILLINOIS.

APPARATUS FOR REGULATING THE ADMIXTURE OF A SOLUTION TO RUNNING WATER.

Application filed March 14, 1927. Serial No. 175,312.

The invention relates to medical appliances and more particularly to a device for producing solutions used as a therapeutical agent.

The invention is applicable not only for medical purposes, but whenever and wherever a solution is desired.

In producing solutions for a given purpose it is customary to provide a certain amount of water and to introduce therein a chemical either in solid or liquid form to obtain thereby a solution of a certain predetermined strength.

This method has the disadvantages that a certain length of time is required to prepare the solution, then the solution must be poured into a receptacle adapted to the use to which the solution is put and that the solution is obtained in a relatively small quantity, so that frequently several quantities of solutions must be made up in order to enable therapeutical treatment.

It is, therefore, an object of the invention to provide a device which will enable the preparation of solutions without the disadvantages pointed out.

A further object aims at providing a device wherein the solution is automatically produced instantly and continuously, so that the supply of the solution is practically inexhaustable for ordinary therapeutical purposes.

Another object aims at providing a device which may be secured to an ordinary water faucet and whose water stream is caused to pass through a chamber, into which the chemical is introduced so that the water passes from the chamber as the desired solution.

It is a still further object to provide a device in which solutions of different strength may be produced at will.

A still further object is to provide a gauge, permitting the formation of the desired strength of the solution.

With these and other equally important objects in view which will become apparent as the description of the invention proceeds, the latter comprises the means stated in the specification, particularly pointed out in the claims forming a part thereof, and illustrated in the drawing, in which:

Fig. 1, is an end view of the apparatus constructed in accordance with my invention;

Fig. 2, is a section on the line 2—2 of Fig. 1;

Fig. 3, is a section on the line 3—3 of Fig. 2; and

Fig. 4, is a section on the line 4—4 of Fig. 2.

Referring to the several views in the drawing, 10, designates a glass container or receptacle, for holding a chemical, either in solid or liquid form, and which, when mixed with water, will produce the desired solution. The container in the embodiment shown is made of glass, but any other material may be selected which may be useful or convenient.

The container 10 is provided with threaded nipples 11 and 12 at the top and bottom, respectively, and cover 13 is threaded onto the nipple 11 and has a reduced upper portion or stem 14, whose bore 15 has communication with the central bore of the nipple 11 and hence with the interior of the receptacle 10. A cap 16 has a threaded engagement with the stem 14. Attention is called to the fact that the stem 14 has a plurality of apertures 17, which establish communication between the bore 15 and the outer side of stem 14. If the cap 16 is screwed down into its lower-most position, then no air can enter through the ports or apertures, 17 into the interior of the receptacle 10. If, however, the cap is raised, so as to uncover one or more of said apertures 17 then admission of air into the receptacle 10 will take place and regulate the rate of flow or discharge of the solution from the receptacle. The cap portions 13 and 16 are made of hard rubber but, of course, any other material may be utilized which will answer the purpose, for which these parts are used. A rubber gasket 18 is interposed between the nipple 11 and the cover 13.

To the nipple 12 a fitting 19, of hard rubber, or any other preferred material is threaded, which is of conical form and is counter-bored at the top to receive the nipple 12 and a rubber gasket 20 which is interposed between the bottom of the recess and the nipple 12. The fitting 19 is provided with a longitudinal bore 21 in communication with the interior of receptacle 10 and the lower end of the fitting is also counterbored and threaded to receive the threaded end of an angular tube 22 to the other end of which is secured by threaded engagement a plug, generally designated by 23. The plug 23 is formed with a chamber 24, which originates at the upper end of said plug and extends downwardly and is narrowed down to provide a smaller chamber 25 giving rise to the formation of an annular seat 26, on which is placed a screen or strainer 27. The chamber 25 is in communication with a longitudinal bore 28 in the lower portion of said plug. The plug at the upper end is counter-bored to provide a space for the reception of a rubber ring 29, the inner diameter of which is equal to the diameter of the annular chamber 24. The wall of the plug 23 is provided with an inclined threaded aperture 30 into which extends the threaded free end of the tube 22. The plug is reduced at the lower end to enable the attachment of a rubber tube 31 to which may be secured a clamp or the like (not shown) to prevent the flow of liquid therethrough. As is indicated in Figure 2 the plug 23, in one form of use of the apparatus, is secured to the lower end of a water faucet 32, air-tight connection being provided by the presence of the rubber ring 29. Attention is called to the fact that the passage of water through the mixing chamber 24 will set up a suction action whereby the chemical is drawn out from the container 10.

The operation of the device is obvious from the foregoing description. In use the water faucet 32 is opened to permit water to flow into and through plug 23. At the same time the cap 16 is adjusted to permit the passage of air into the receptacle 10 and the flow of the solution from the receptacle into the chamber 24 of the plug 23 where it mixes with the water to be diluted and to obtain a solution of the proper strength which will be issued through the tube 31.

In order to vary the strength of the solution, it is necessary to adjust the position of the cap 16, so as to increase or decrease, as the case may be, the passage of air into the receptacle 10 and controlling thereby the flow of the chemical into the mixing chamber 24. In order to eliminate experimentation and to obtain solutions of the desired strength the cover 13 is provided with a series of graduations 33 and the cap 16 is provided with an index line 34, which cooperates with said graduations. The device is primarily used for medical purposes and particularly in the treatment of female diseases, such as leucorrhea and vaginitis, in general. When so used the tube 31 secured thereto at the free end is an attachment or a fountain-head, as will be well understood by those versed in the art. Particular attention is called to the fact that previously it was impossible to obtain a solution in sufficient quantities, sufficient to permit a continuous treatment. This was due to the fact that no receptacles of sufficient size were available for the solution, for instance several gallons could not be made up so that the user could only get a short-time treatment, without experiencing the beneficial results, which would have been obtained if the treatment were being extended for a considerable period of time and with a quantity sufficient to obtain curative effects. With the present invention the disadvantage adherent in the old method has been completely eliminated. The receptacle 10 contains a chemical in concentrated, or nearly concentrated form, and does not need to be of appreciable capacity. The mixing of the chemical to a predetermined extent with the current of water emitted from the water faucet produces instantly a continuous flow of the desired solution, so that the user is at all times securing the desired solution and can obtain therapeutical treatment for any length of time, within, of course, practical limits.

The use of the apparatus for the treatment of diseases is not limited to the instance mentioned, but it may be extended to any treatment where irrigation or flushing is desired. The device may also be employed for the purpose of sterilization of hands or other parts of the body or of articles in general; it may be employed for the purpose of shampooing the hair or any other use may be had wherever it is necessary to produce solutions in large quantities. While the drawing shows one embodiment of the invention, the same is illustrated by way of example and not by way of limitation. Numerous changes, alterations, modifications and re-arrangements may be made without departing from the spirit of the invention.

I, therefore, do not limit myself to the details of construction or arrangement, as shown, but claim my invention as broadly as the state of the art permits.

I claim:

1. Apparatus regulating the admixture of a solution to running water, including a stationary container, a fitting rigidly connected to a source of water supply and having a chamber, a tube connecting said container and said chamber, a hose for the discharge from said chamber, and air controlled means on said container for regulating the rate of flow through said tube.

2. Apparatus regulating the admixture of a solution to running water, including a stationary container, a fitting rigidly connected to a source of water supply and having a chamber, a tube connecting said container and said chamber, a hose for the discharge from said chamber, air controlled means on said container for regulating the rate of flow through said tube, and means for indicating the rate of flow from said container.

3. Apparatus regulating the admixture of a solution to running water, including a stationary container, a fitting connected to a source of water supply and having a chamber, a rigid tube connecting said container and said chamber, a hose for the discharge from said fitting, and a filter in said chamber above said hose for retarding the discharge.

In witness whereof I affix my signature.

IDA ROSENBERG.